(12) United States Patent  
Hirooka et al.

(10) Patent No.: US 8,159,783 B2
(45) Date of Patent: Apr. 17, 2012

(54) SUBSTRATE WITH INTERMEDIATE LAYER FOR THIN-FILM MAGNETIC HEAD AND METHOD OF MANUFACTURING THE SUBSTRATE WITH INTERMEDIATE LAYER

(75) Inventors: Taisuke Hirooka, Hyogo (JP); Hironobu Tsubota, Kyoto (JP)

(73) Assignee: Hitachi Metals, Ltd., Tokyo (JP)

( * ) Notice: Subject to any disclaimer, the term of this patent is extended or adjusted under 35 U.S.C. 154(b) by 1603 days.

(21) Appl. No.: 10/559,704

(22) PCT Filed: May 13, 2005

(86) PCT No.: PCT/JP2005/008792
§ 371 (c)(1),
(2), (4) Date: Dec. 7, 2005

(87) PCT Pub. No.: WO2005/112008
PCT Pub. Date: Nov. 24, 2005

(65) Prior Publication Data
US 2006/0187588 A1  Aug. 24, 2006

(30) Foreign Application Priority Data
May 17, 2004  (JP) .................................. 2004-146493

(51) Int. Cl.
*G11B 5/127* (2006.01)
(52) U.S. Cl. ............... 360/125.38; 360/235.1; 360/235.3
(58) Field of Classification Search ............. 360/123.24, 360/123.45, 125.38–125.39, 125.41, 235.1, 360/235.3
See application file for complete search history.

(56) References Cited

U.S. PATENT DOCUMENTS

| 4,796,127 A | | 1/1989 | Wada et al. |
|---|---|---|---|
| 4,814,915 A | | 3/1989 | Wada et al. |
| 5,405,810 A | * | 4/1995 | Mizuno et al. .................. 438/16 |
| 5,729,411 A | | 3/1998 | Kishi et al. |
| 5,894,388 A | * | 4/1999 | Sato et al. ................ 360/125.51 |
| 5,901,021 A | | 5/1999 | Hirano et al. |
| 6,048,632 A | * | 4/2000 | Solin et al. ................ 428/811.4 |
| 6,078,479 A | * | 6/2000 | Nepela et al. ................ 360/318 |
| 6,158,108 A | * | 12/2000 | Seagle ....................... 29/603.14 |

(Continued)

FOREIGN PATENT DOCUMENTS

GB  2 359 183 A  8/2001

(Continued)

OTHER PUBLICATIONS

Official communication issued in the corresponding International Application No. PCT/JP2005/008792, mailed on Nov. 30, 2006.

(Continued)

*Primary Examiner* — Daniell L Negron
*Assistant Examiner* — Carlos E Garcia
(74) *Attorney, Agent, or Firm* — Keating & Bennett, LLP

(57) ABSTRACT

A thin-film magnetic head substrate according to the present invention includes: a ceramic base with a principal surface; and an undercoat film, which covers the principal surface of the ceramic base. An electrical/magnetic transducer is provided on the undercoat film. The substrate further includes an intermediate layer between the principal surface of the ceramic base and the undercoat film. The intermediate layer is made of a material other than an aluminum oxide and has been patterned so as to make a portion of the principal surface of the ceramic base contact with the undercoat film.

19 Claims, 7 Drawing Sheets

U.S. PATENT DOCUMENTS

| | | | |
|---|---|---|---|
| 6,277,506 | B1 | 8/2001 | Okamoto |
| 6,870,706 | B1 * | 3/2005 | Zhu ............................ 360/128 |
| 2002/0008946 | A1 | 1/2002 | Noma |
| 2002/0126423 | A1 | 9/2002 | Terunuma et al. |
| 2003/0036025 | A1 * | 2/2003 | Hirooka ........................ 430/394 |
| 2004/0027719 | A1 * | 2/2004 | Gider et al. ................... 360/128 |
| 2004/0066575 | A1 | 4/2004 | Hirooka |
| 2005/0024772 | A1 | 2/2005 | Tsubota |
| 2005/0068687 | A1 * | 3/2005 | Sbiaa et al. ................ 360/324.1 |
| 2005/0174687 | A1 * | 8/2005 | Edelman et al. .............. 360/128 |

FOREIGN PATENT DOCUMENTS

| | | |
|---|---|---|
| GB | 2 391 104 A | 1/2004 |
| JP | 5-325134 A | 12/1993 |
| JP | 11-283221 | 10/1999 |
| JP | 11-339229 | 12/1999 |
| JP | 2000-260009 | 9/2000 |
| JP | 2004-127442 | 4/2004 |

OTHER PUBLICATIONS

Official communication issued in counterpart UK Application No. GB0601106.8, mailed on Feb. 27, 2008.

International Search Report for PCT Application No. PCT/JP2005/008792. International filing date, May 13, 2005.

* cited by examiner

FIG. 7 PRIOR ART
(a)
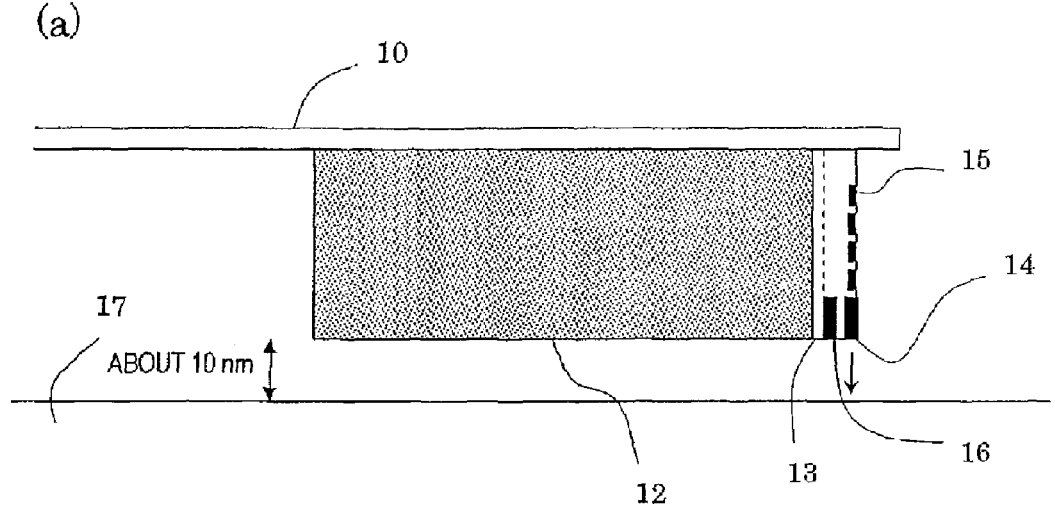
(b)
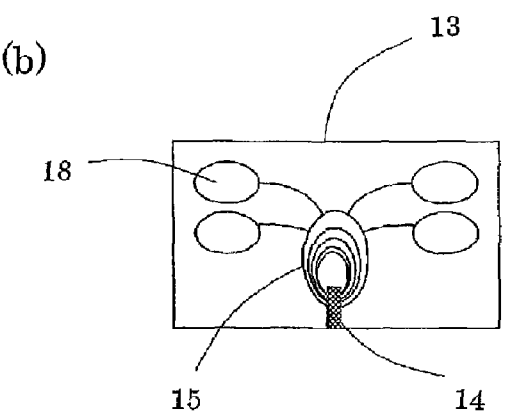

FIG.8
(a)
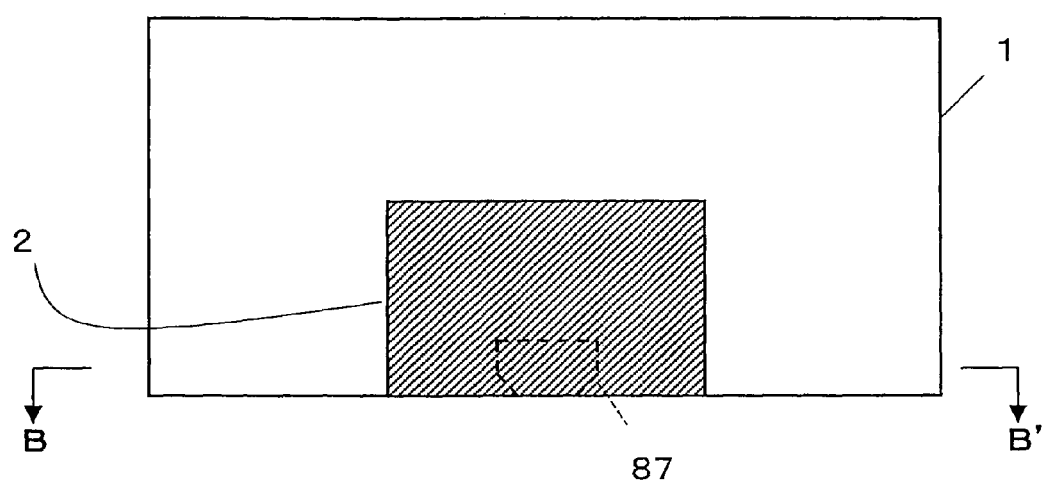
(b)
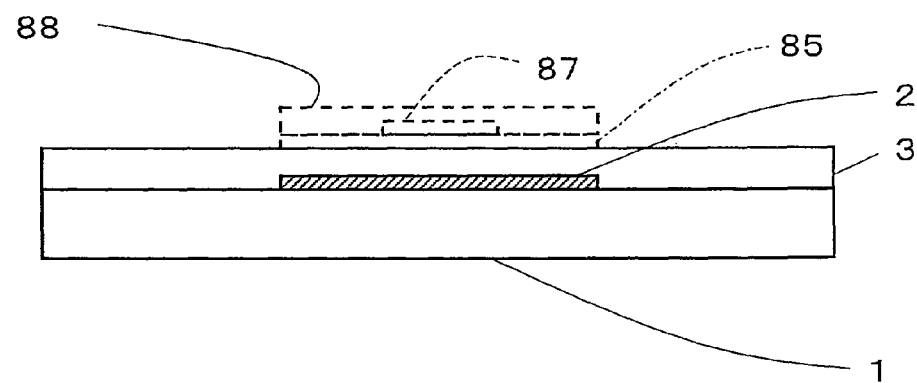

SUBSTRATE WITH INTERMEDIATE LAYER FOR THIN-FILM MAGNETIC HEAD AND METHOD OF MANUFACTURING THE SUBSTRATE WITH INTERMEDIATE LAYER

BACKGROUND OF THE INVENTION

1. Field of the Invention

The present invention relates to a substrate for use to make a thin-film magnetic head slider for a hard disk drive (which will be referred to herein as a "thin-film magnetic head substrate") and also relates to a method of manufacturing such a substrate.

2. Description of the Related Art

Thanks to recent tremendous development of information and telecommunication technologies, the amount of information that can be processed by computers has increased by leaps and bounds. In particular, audiovisual (or multimedia) information such as audio, music and video, which used to be capable of being processed only as analog signals, now can be converted into digital signals and processed by personal computers. Multimedia data such as music and video contains a huge amount of information. Thus, it has become more and more necessary to further increase the capacity of information storage devices for use in personal computers, for example.

A hard disk drive is a typical information storage device that has been used broadly in personal computers, for example. To meet the demand described above, the capacity of hard disks needs to be further increased and the overall size of the drive needs to be reduced. Meanwhile, a hard disk recorder for writing video data on a hard disk directly and an audio player for writing musical data on a hard disk have become increasingly popular these days. In these recorders and players, the storage capacity also needs to be further increased and the overall size of the hard disk drive also needs to be decreased to make the recorder or player ready to carry about.

FIGS. 7(a) & 7(b) are a cross-sectional view schematically illustrating a thin-film magnetic head slider and surrounding portions thereof in a conventional hard disk drive. As shown in FIGS. 7(a) & 7(b), an undercoat film 13 is provided on a side surface of a base 12, which is supported on a gimbal 10. A read device 16 is provided as a read head on the undercoat film 13 and a write device 14 is further provided as a write head adjacent to the read device 16. Such a unit, including the base 12, write device 14 and read device 16 to be supported on the gimbal 10, is normally called a "head slider" or simply "slider".

The write device 14 is made of a magnetic material and has a ring configuration, inside of which a coil 15 is wound. When a write signal is supplied to the coil 15, a magnetic field is generated in the write device 14, thereby writing data on a magnetic storage medium 17.

On the other hand, the read device 16 as a read head is a magneto-resistive (MR) or giant MR (GMR) element to convert a variation in magnetic field into a variation in electrical resistance. That is to say, the read device 16 senses a variation in the magnetic field recorded on the magnetic storage medium 17 and converts the variation into an electrical signal.

The base 12 to hold the read device 16 and the write device 14 thereon has often been made of an $Al_2O_3$—TiC based ceramic sintered body. The $Al_2O_3$—TiC based ceramic material (which will be referred to herein as an "AlTiC material") has been used extensively because this material exhibits excellent thermal and mechanical properties and processibility while striking an adequate balance between them. However, the AlTiC material is a good electrical conductor. Accordingly, if a read/write device 14' or the write device 14 were disposed adjacent to such a conductor base 12, then the read device 16 or write device 14 would be short-circuited and could not operate properly. Also, the surface of such an AlTiC base is not sufficiently smooth. For that reason, to electrically insulate the read device 16 or write device 14 from the base 12 sufficiently and increase the smoothness of the surface of the base 12, the undercoat film 13 of $Al_2O_3$ is normally provided on the side surface of the base 12. This is because $Al_2O_3$ exhibits a good electrical insulation property and has a smooth enough surface.

The conventional slider, however, has various problems to overcome.

Firstly, as it has become more and more necessary to reduce the overall size of hard disk drives, sliders also must be further reduced in size. To reduce the size of sliders, the cross-sectional area of the coil 15 inside of the write device 14 should be reduced as shown in FIG. 7(b). More specifically, the inside diameter of the coil 15 needs to be minimized and yet respective loops of the coil 15 should not overlap with each other. However, when a current flows through the coil 15 with such a reduced cross-sectional area by way of terminals 18, the quantity of heat generated per unit area increases.

However, $Al_2O_3$, which has often been used as a material for the undercoat film 13, does not have so good thermal conductivity as AlTiC. Accordingly, the heat, generated by supplying the coil 15 with current, is shut off by the $Al_2O_3$ undercoat film 13, and cannot diffuse toward the base 12 sufficiently. Thus, the heat is stored in the read device 16 or the write device 14. As a result, the read device 16 or the write device 14 thermally expands to possibly cause read errors or write errors.

To overcome this problem, the undercoat film 13 may have a reduced thickness so that the heat can be dissipated into the base 12 more easily. In that case, however, the dielectric breakdown strength might decrease, which is another problem to overcome.

To stabilize the characteristics of an MR device fabricated on an undercoat film of $Al_2O_3$, the undercoat film is required to have a smooth surface. For that purpose, in the prior art, the $Al_2O_3$ film, deposited on a ceramic base, is subjected to a CMP or any other process to planarize the surface of the undercoat film of $Al_2O_3$. Also, to increase the degree of adhesiveness, normally an inverse sputtering process may be carried out before the $Al_2O_3$ film is deposited on an AlTiC base or a sputtering process may be carried out with a bias voltage applied (which is called a "bias sputtering process") while the $Al_2O_3$ film is being deposited. If the inverse sputtering process or the bias sputtering process is carried out, then the surface to deposit a film thereon is etched.

The AlTiC base is a composite sintered body of dissimilar materials (i.e., $Al_2O_3$ and TiC), which have mutually different etch rates. For that reason, the crystal level differences on the surface of the AlTiC base further expand as a result of the inverse or bias sputtering process. The $Al_2O_3$ undercoat film just deposited may have a surface roughness Ra of about 1 nm to about 5 nm. However, the thinner the undercoat film gets (e.g., comes to have a thickness of 0.4 µm or less), the more difficult it is to perform the planarization process.

To overcome these problems, Japanese Patent Application Laid-Open Publication No. 11-283221 discloses that a conventional undercoat film 13 is provided on a base 12 and an amorphous alumina film is deposited to a thickness of 100 nm to 55,000 nm on the undercoat film 13 by an ECR sputtering process. Japanese Patent Application Laid-Open Publication No. 11-283221 insists that high dielectric breakdown strength is achieved by such a structure because the amorphous alumina film deposited by the ECR sputtering process has high density.

However, to obtain such a structure, an ECR sputtering system needs to be used. That is to say, two different types of systems need to be used to make the conventional undercoat film 13 and that amorphous alumina film, respectively, thus increasing the manufacturing cost of the substrate significantly.

Patent Document No. 1: Japanese Patent Application Laid-Open Publication No. 11-283221
Patent Document No. 2: Japanese Patent No. 1899891
Patent Document No. 3: U.S. Pat. No. 4,796,127
Patent Document No. 4: Japanese Patent No. 1659501
Patent Document No. 5: U.S. Pat. No. 4,814,915
Patent Document No. 6: Japanese Patent Application Laid-Open Publication No. 2000-260009

SUMMARY OF THE INVENTION

In order to overcome the problems described above, preferred embodiments of the present invention provide a thin-film magnetic head substrate and a manufacturing method thereof that can be used effectively to significantly increase the reliability of a miniaturized, high-capacity hard disk drive by eliminating the problems described above.

A thin-film magnetic head substrate according to the present invention includes: a ceramic base with a principal surface; and an undercoat film, which is made of an aluminum oxide and which covers the principal surface of the ceramic base. An electrical/magnetic transducer is provided on the undercoat film. The substrate further includes an intermediate layer between the principal surface of the ceramic base and the undercoat film. The intermediate layer is made of a material other than the aluminum oxide and has been patterned so as to make a portion of the principal surface of the ceramic base contact with the undercoat film.

In one preferred embodiment, the intermediate layer has an opening where the electrical/magnetic transducer is not located.

In this particular preferred embodiment, the electrical/magnetic transducer provided on the undercoat film includes: a lower magnetic shield film; a magneto-resistive element arranged on the lower magnetic shield film; and an upper shield film, which has been deposited on the lower magnetic shield film so as to cover the magneto-resistive element. The intermediate layer has been patterned so as to cover the entire projection of the magneto-resistive element on the principal surface of the ceramic base.

In a specific preferred embodiment, the intermediate layer has been patterned so as to cover the entire projection of the lower magnetic shield film on the principal surface of the ceramic base.

In still another preferred embodiment, a portion of the intermediate layer makes an alignment mark for use in positional alignment.

In yet another preferred embodiment, a portion of the intermediate layer makes a pattern representing identification information.

In this particular preferred embodiment, the identification information includes information about the identity of the ceramic base.

Alternatively or additionally, the pattern representing the identification information has been recorded on a plurality of areas of the principal surface of the ceramic base, and mutually different pieces of the information are distributed to the respective areas.

In a specific preferred embodiment, the areas are arranged so as to form multiple different thin-film magnetic heads when the substrate is divided.

In yet another preferred embodiment, the intermediate layer has a thickness of 1 nm to 1 µm.

In yet another preferred embodiment, the intermediate layer is made of a metal film or an Si film.

In yet another preferred embodiment, the intermediate layer is made of a material selected from the group consisting of Cu, alloys including Cu, Cr, alloys including Cr, and Si.

In yet another preferred embodiment, the undercoat film has a thickness of 10 nm to 1 µm.

In yet another preferred embodiment, the ceramic base is made of an alumina-based ceramic material including 24 mol % to 75 mol % of $\alpha$-$Al_2O_3$ and at most 2 mol % of an additive.

In yet another preferred embodiment, the ceramic base further includes a carbide or nitride carbonate of a metal.

A thin-film magnetic head slider includes a thin-film magnetic head substrate according to any of the preferred embodiments described above and an electrical/magnetic transducer, which is provided on the undercoat film of the thin-film magnetic head substrate.

A hard disk drive according to preferred embodiments of the present invention includes the thin-film magnetic head slider described above.

A method of manufacturing a thin-film magnetic head substrate according to preferred embodiments of the present invention is a method of manufacturing a thin-film magnetic head substrate that includes a ceramic base with a principal surface and an undercoat film covering the principal surface of the ceramic base and including an electrical/magnetic transducer thereon. The method includes the steps of forming a patterned intermediate layer, made of a non-aluminum-oxide material, on the ceramic base and forming an undercoat film, made of an aluminum oxide, on the ceramic base such that the undercoat film covers the patterned intermediate layer.

In one preferred embodiment, the step of forming the patterned intermediate layer includes the steps of: depositing a film of the non-aluminum-oxide material on the ceramic base; defining a patterned resist mask on the film; etching away portions of the film that are not covered with the resist mask, thereby forming the patterned intermediate layer; and removing the resist mask.

In an alternative preferred embodiment, the step of forming the patterned intermediate layer includes the steps of: defining a patterned resist mask on the ceramic base; depositing a film of the non-aluminum-oxide material on the resist mask; and making the patterned intermediate layer out of portions of the film by a liftoff process that removes the resist mask.

In yet another preferred embodiment, the step of forming the patterned intermediate layer on the ceramic base includes patterning the intermediate layer such that the intermediate layer has an opening where the electrical/magnetic transducer is not located.

A method of making a thin-film magnetic head slider according to preferred embodiments of the present invention includes the steps of preparing a thin-film magnetic head substrate according to any of the preferred embodiments described above and fabricating the electrical/magnetic transducer on the undercoat film.

According to preferred embodiments of the present invention, the patterned intermediate layer increases the electrical dielectric breakdown strength of the undercoat film made of an aluminum oxide, thus providing a thin-film magnetic head substrate with good reliability.

BRIEF DESCRIPTION OF DRAWINGS

FIG. 7(a) is a cross-sectional view schematically illustrating the structure of a conventional thin-film magnetic head slider, and FIG. 7(b) is a plan view schematically illustrating the configuration of the write device.

FIG. 8(a) shows a layout (or the arrangement) of an electrical/magnetic transducer and a patterned intermediate layer 2 according to an example, and FIG. 8(b) is a cross-sectional view thereof as viewed on the B-B' plane.

DETAILED DESCRIPTION OF PREFERRED EMBODIMENTS

The present inventors carried out an extensive research on conventional thin-film magnetic head substrates. As a result, the present inventors discovered that as the thickness of the undercoat film of an aluminum oxide was going to be reduced, the actual electrical insulation property of the undercoat film was worse than what was expected from the reduced thickness.

The present inventors also discovered that even if the thickness of the undercoat film of an aluminum oxide was reduced, the dielectric breakdown strength of the undercoat film could be increased by inserting an intermediate layer, made of a film with conductivity or semi-conductivity, between the undercoat film and the base, thus acquiring the basic idea of the present invention. It should be easily understood that if another insulating film were inserted between the undercoat film and the base to compensate for the insulating property of the thinned undercoat film, the overall insulating property of those films would improve. However, it is unknown exactly how and why the electrical insulating property of a thin undercoat film is improved by arranging an intermediate layer of a non-insulating material under the undercoat film as is done in the present invention.

If a non-insulating intermediate layer is provided between the ceramic base of AlTiC, for example, and the undercoat film of an aluminum oxide, then the surface of the base before the undercoat film is deposited thereon functions as a flat conductive surface due to the presence of the intermediate layer. The undercoat film of the aluminum oxide, deposited on that surface, has a very small surface roughness Ra of about 0.3 nm to about 1 nm. As a result, the post-deposition planarization process can be either omitted or carried out very easily at least.

Figure 1:
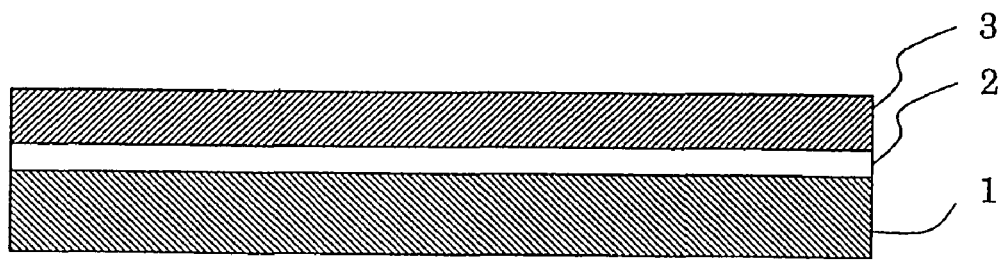
FIG. 1 is a cross-sectional view illustrating the structure of a thin-film magnetic head substrate according to the present invention.

Hereinafter, a thin-film magnetic head substrate according to the present invention will be described. As shown in FIG. 1, a thin-film magnetic head wafer according to this preferred embodiment includes a ceramic base 1, an undercoat film 3, and an intermediate layer 2, which is sandwiched between the ceramic base 1 and the undercoat film 3.

To prevent the electrostatic breakdown, the ceramic material of the ceramic base 1 preferably has a volume resistivity that is within a range in which almost no static electricity is stored. More specifically, the ceramic material preferably has a volume resistivity of at most $1\times10^9$ $\Omega\cdot$cm, which is the highest allowable volume resistivity of so-called "semi-conductive materials". On the other hand, the lower the volume resistivity of the ceramic material, the less likely it is that the static electricity is stored there. However, if the volume resistivity of the ceramic material is too low, then a metallic bonding property will dominate the ceramic material. In that case, the ceramic material should exhibit a high cutting resistance and a poor tribology property. For that reason, the volume resistivity of the ceramic material is preferably at least $1\times10^{-5}$ $\Omega\cdot$cm. Consequently, the ceramic base preferably has a volume resistivity of $1\times10^{-5}$ $\Omega\cdot$cm to $1\times10^9$ $\Omega\cdot$cm.

The ceramic base 1 is also preferably made of a material having high thermal conductivity. To prevent the heat which is generated from the read and write devices from being stored in the devices but to allow the heat to diffuse efficiently into the ceramic base 1 by way of the undercoat film 3 and intermediate layer 2, the ceramic material preferably has a thermal conductivity of at least 5 W/mK, more preferably at least 15 W/mK.

A ceramic material having any of various compositions may be used for the ceramic base 1 as long as the ceramic material exhibits those preferred properties. Among other things, the present invention can be significantly effective by using a composite ceramic base including two or more compounds with mutually different electrical conductivities or insulation properties. For example, the ceramic base 1 may include 24 mol % to 75 mol % of $\alpha$-$Al_2O_3$ and the balance thereof may include a metal carbide or a metal carbonate nitride and 2 mol % or less of a sintering assistant. A base material having such a composition has only a few openings or pores and can be finished so as to have a very low surface roughness, and therefore, can be used effectively as a base material for a thin-film magnetic head slider. More specifically, a base made of a ceramic material including 24 mol % to 75 mol % of $\alpha$-$Al_2O_3$, 24 mol % to 75 mol % of TiC and 2 mol % or less of a sintering assistant, can be used particularly effectively in a thin-film magnetic head slider.

Examples of other preferred ceramic bases that are applicable for use in a thin-film magnetic head slider according to the present invention include a base made of an SiC—$Al_2O_3$ ceramic material as disclosed in Patent Documents Nos. 2 and 3, a base made of a $ZrO_2$—$Al_2O_3$ ceramic material as disclosed in Patent Documents Nos. 4 and 5, and a base made of a $ZrO_2$—SiC material, which is well known as a typical conductive ceramic material. However, a material that is hard to process into a desired shape and exhibits a poor tribology property (e.g., SiC) is not suitable for the ceramic base 1.

As described above, the intermediate layer 2 is preferably provided on the ceramic base 1 so as to flatten the surface of the base on which the undercoat film 3 will be deposited and to prevent any portion of the undercoat film 3 from reacting to the ceramic base 1 and turning into an electrically conductive compound. Thus, to make the entire surface of the ceramic base 1 uniform, the intermediate layer 2 preferably has the same composition overall and preferably covers the surface of the ceramic base 1 entirely. Also, the intermediate layer 2 is preferably made of a material with good thermal conductivity and adhesiveness.

Specifically, if the surface roughness of the ceramic base 1 and the conditions for forming the intermediate layer are appropriately selected, then the entire surface of the ceramic base 1 can be coated uniformly with the intermediate layer with a thickness of 1 nm or more. If the thickness of the intermediate layer 2 is increased to 3 nm or more, the entire surface of the ceramic base 1 can be coated uniformly with more certainty. However, if the intermediate layer 2 is less than 1 nm thick, then it is difficult to cover the entire surface of the ceramic base 1 uniformly with such a thin intermediate layer 2 and some portions of the surface of the ceramic base 1 are likely to be exposed unintentionally.

As long as the surface of the base on which the undercoat film 3 is going to be deposited can be flattened, the effects of the present invention are still achievable no matter how thick the intermediate layer 2 may be. Nevertheless, if the thickness of the intermediate layer 2 exceeded 100 nm, then it would take an excessively long time to form the intermediate layer 2, thus dropping the productivity of thin-film magnetic head substrates. Also, the thickness of the intermediate layer 2 should not exceed 1 μm. The reason is as follows. Specifically, when the slider is complete, a portion of that thick intermediate layer 2, exposed on the ABS plane, will have an increased cross-sectional area. Then, big level differences are easily produced on the ABS plane due to a difference in thermal expansion coefficient or hardness among the ceramic base 1, undercoat film 3 and intermediate layer 2. In view of these considerations, the intermediate layer 2 preferably has a thickness of 1 nm to 1 μm, more preferably 3 nm to 100 nm.

As such an intermediate layer 2 having these features, a metal film or an insulating layer of silicon is preferably used. Considering their good adhesiveness and thermal conductivity, the material of the intermediate layer 2 is preferably selected from the group consisting of Cu, Cr, Si, alloys including Cu and alloys including Cr. Examples of other preferred metals for the intermediate layer 2 include Ni, Au, Ag, Fe, Co and Ti.

The undercoat film 3 is made of an amorphous aluminum oxide. To exhibit an electrical insulation property represented by predetermined dielectric breakdown strength or more, the undercoat film 3 preferably has a thickness of at least 10 nm. Also, in order to conduct the heat, generated in the read or write device on the undercoat film 3, toward the ceramic base 1 quickly, the undercoat film 3 preferably has a thickness of at most 1 μm.

As will be described in detail later, significant effects are achieved by the present invention if the undercoat film 3 has a thickness of 0.4 μm or less. However, considering a possible variation in thickness within a plane of the ceramic base and a variation in thickness among the ceramic bases themselves, it is difficult to exactly set the thickness of the undercoat film 3 to a predetermined value of 0.4 μm or less. Thus, the effects of the present invention should be achieved to varying degrees if the undercoat film 3 has a thickness of 1.0 μm or less.

In the thin film magnetic head substrate having such a structure, the undercoat film is relatively thin but can still exhibit excellent electrical insulation property. Thus, the thin film magnetic head substrate can have its thermal conductivity improved by reducing the thickness of the undercoat film and yet maintain excellent electrical insulation property. Among other things, a thin film magnetic head substrate, including a metal layer as its intermediate layer, is totally novel and unexpected from the prior art in that the substrate uses the metal layer to increase its electrical insulation property.

The present inventors discovered and confirmed via experiments that these effects to be achieved by inserting such an intermediate layer could also be accomplished even when the intermediate layer did not fill the entire gap between the undercoat film 3 and the ceramic base 1. That is to say, even if the undercoat film 3 is partially in direct contact with the surface of the base 1 by using a patterned intermediate layer, the effects described above are also achieved due to the presence of the intermediate layer.

EXAMPLE 1

Hereinafter, a specific example of preferred embodiments of the present invention will be described. In the following specific example, a thin film magnetic head substrate was actually manufactured and its electrical insulation property was evaluated.

On an AlTiC base 1 including 70 vol % of α-$Al_2O_3$ and 30 vol % of TiC, an intermediate layer 2 including Cr, Cu or Si was deposited to any of various thicknesses by a sputtering process with no bias voltage applied. Thereafter, an undercoat film 3 of an aluminum oxide was deposited thereon to any of various thicknesses by a sputtering process with an $Al_2O_3$ target used and with a bias voltage applied thereto.

As a comparative example, another sample was prepared under the same conditions except that no intermediate layer 2 was provided.

To evaluate the properties of the samples prepared, the dielectric breakdown voltages of these samples were measured. An AlCu film was deposited to a thickness of 1 μm on the undercoat film 3 of each sample and then a resist pattern, including 240 μm square pattern elements at an interval of 240 μm, was defined on the AlCu film. Thereafter, the AlCu film, undercoat film 3 and intermediate layer 2 were selectively wet-etched away with the resist pattern used as a mask. Then, the resist pattern was stripped.

Figure 2:
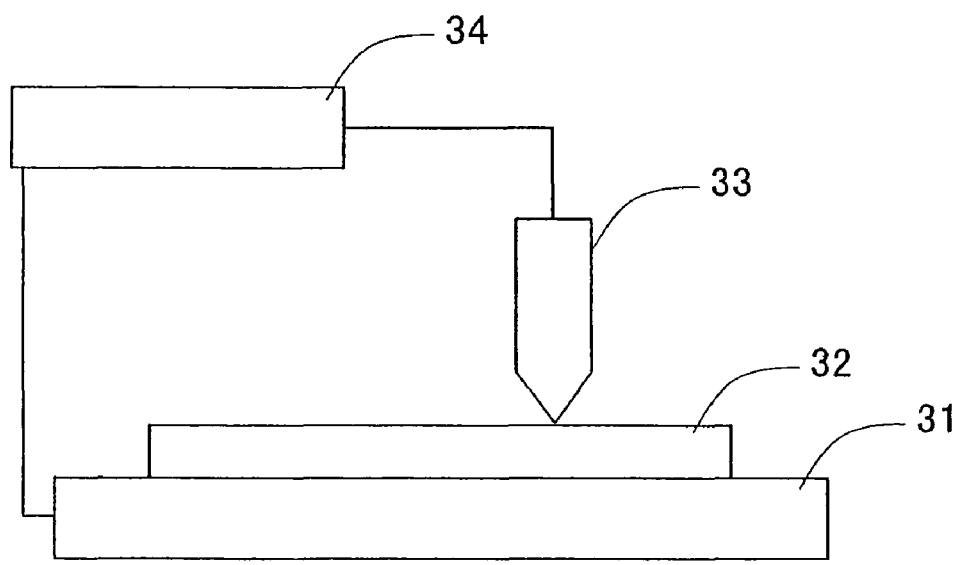
FIG. 2 is a schematic representation illustrating a configuration for an apparatus for measuring the dielectric breakdown voltage.

A portion of the undercoat film 3, where the dielectric breakdown voltage would be measured, had its thickness obtained by Nanospec 6100 produced by Nanometrix, Inc. Thereafter, as shown in FIG. 2, each sample 32 was adsorbed onto a stage 31, which was connected to one terminal of a micro current meter 34 (e.g., R8340 produced by Advantest Corp.), while a probe 33, which was connected to the other terminal of the micro current meter 34, was brought into contact with the AlCu pattern. Then, the amount of current flowing was measured a number of times with the applied voltage increased from 0 V by 100 V each time. When the amount of current flowing reached 100 μA, the sample was regarded as having caused a dielectric breakdown and the voltage applied at that point in time was regarded as its dielectric breakdown voltage.

Figure 3:
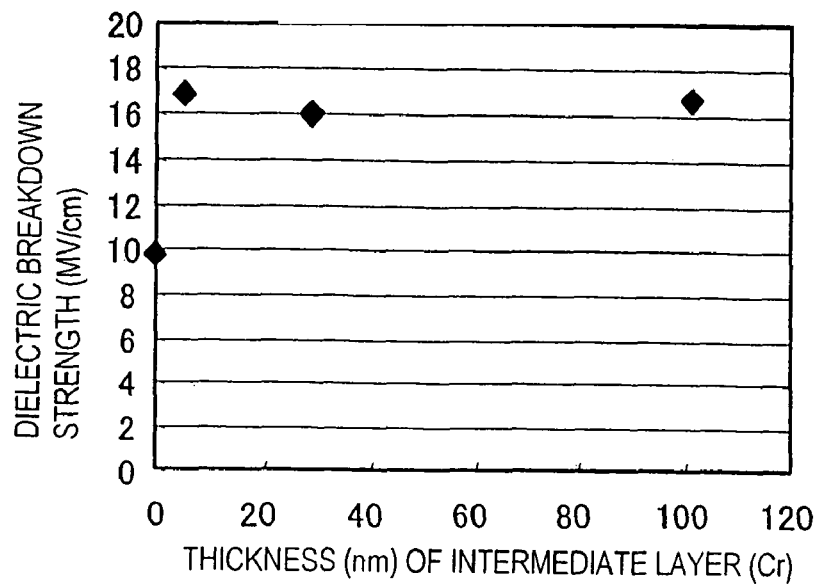
FIG. 3 is a graph showing a relationship between the thickness of an intermediate layer and the dielectric breakdown strength.

FIG. 3 is a graph showing how the dielectric breakdown strength changed with the thickness of the intermediate layer 2 of Cr. In this case, the undercoat film 3 had a thickness of 0.2 μm and the dielectric breakdown strength shown in FIG. 3 was obtained by dividing the dielectric breakdown voltage thereof by the thickness of the undercoat film 3. As shown in FIG. 3, when no intermediate layer 2 was provided (i.e., when its thickness was 0 nm), the dielectric breakdown strength was 10 MV/cm. However, when an intermediate layer 2 with a thickness of 3 nm was provided, the dielectric breakdown strength increased to 17 MV/cm. Also, if the thickness of the intermediate layer 2 was 3 nm or more, then the dielectric breakdown strength was substantially constant. Thus, it can be seen that as long as the intermediate layer 2 covered the surface of the ceramic base 1 almost entirely, the dielectric breakdown strength could be increased no matter how thick the intermediate layer 2 was.

Figure 4:
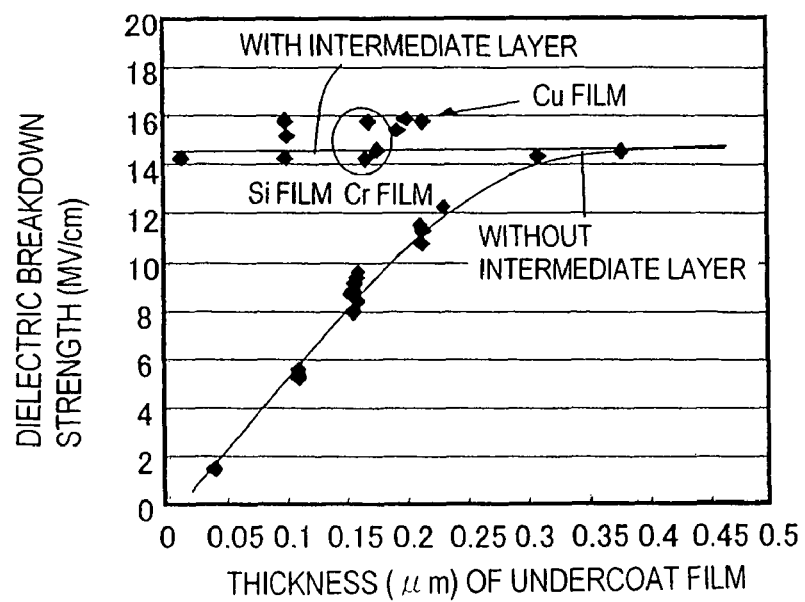
FIG. 4 is a graph showing relationships between the thickness of an undercoat film and the dielectric breakdown strength.

FIG. 4 is a graph showing how the dielectric breakdown strength changed with the thickness of the undercoat film. In this case, the intermediate layer was a film of Si, Cr or Cu with a thickness of 30 nm and the dielectric breakdown strength shown in FIG. 4 was obtained by dividing the dielectric breakdown voltage by the thickness of the undercoat film 3. FIG. 4 also shows how the dielectric breakdown strength changed when the undercoat film was directly deposited on the base with no intermediate layer provided between them. As shown in FIG. 4, if no intermediate layer was provided and if the undercoat film had a thickness of 0.3 μm or less, then the dielectric breakdown strength decreased. On the other hand, if the intermediate layer was provided, a dielectric breakdown strength of about 14.5 MV/cm was always obtained no matter how thick the undercoat film was. That is to say, when the intermediate layer was provided, the dielectric breakdown voltage of the undercoat film per unit thickness was substantially constant. Thus, the dielectric breakdown strength of the undercoat film could be estimated from its thickness.

Figure 5:
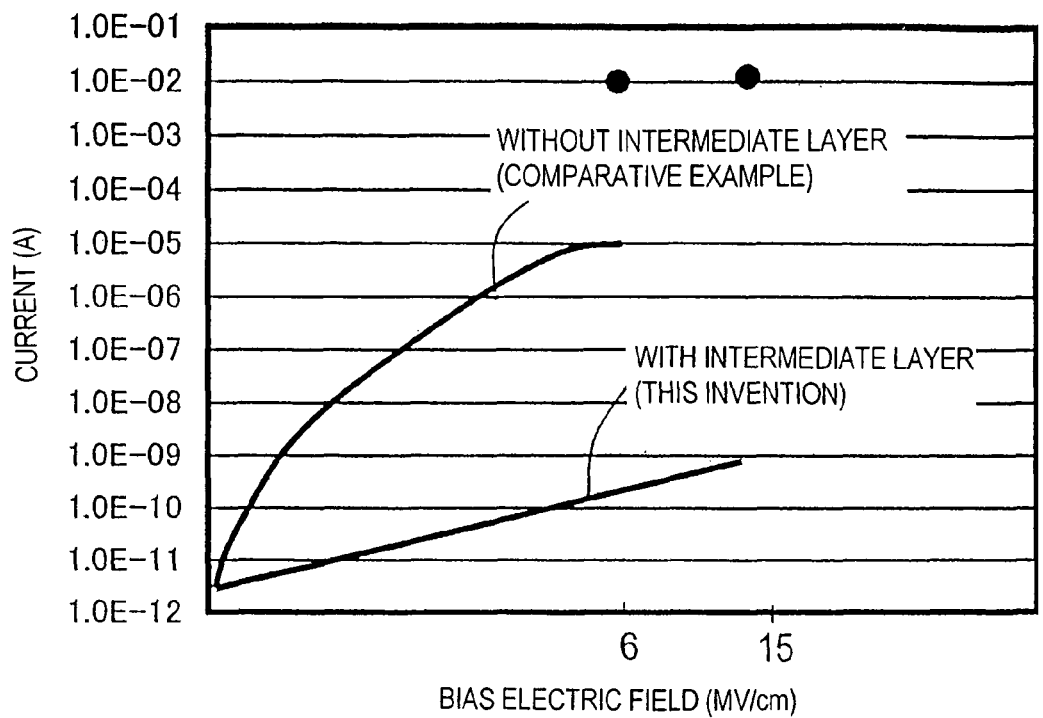
FIG. 5 is a graph showing relationships between the bias electric field and the leakage current.

FIG. 5 is a graph showing how the amount of leakage current increases with the voltage applied to the undercoat film 3 with a thickness of 0.15 μm. In FIG. 5, the applied voltage is represented by the intensity of a bias electric field divided by the thickness of the undercoat film 3. As shown in FIG. 5, in the sample including the intermediate layer 2 according to the present invention, as the intensity of the bias electric field increased, the amount of the leakage current increased monotonically. And when the bias electric field reached an intensity of about 15 MV/cm, dielectric breakdown occurred. On the other hand, in the sample including no intermediate layer 2 according to a comparative example, as the intensity of the bias electric field increased, the amount of the leakage current increased steeply. And when the bias electric field reached an intensity of about 6 MV/cm, dielectric breakdown occurred. The amount of leakage current flowing just before the dielectric breakdown occurred was about 1 mA in the sample including the intermediate layer 2 according to the present invention, but was about 10 mA in the sample including no intermediate layer 2 according to the comparative example. Thus, in the sample including no intermediate layer 2 according to the comparative example, even before the dielectric breakdown actually happened, the amount of the leakage current had already increased significantly and the electrical insulation property had already deteriorated. On the other hand, the sample including the intermediate layer 2 according to the present invention maintained good electrical insulation property until the dielectric breakdown finally happened.

EXAMPLE 2

Hereinafter, a specific preferred embodiment of a thin-film magnetic head slider according to the present invention will be described.

Figure 6:
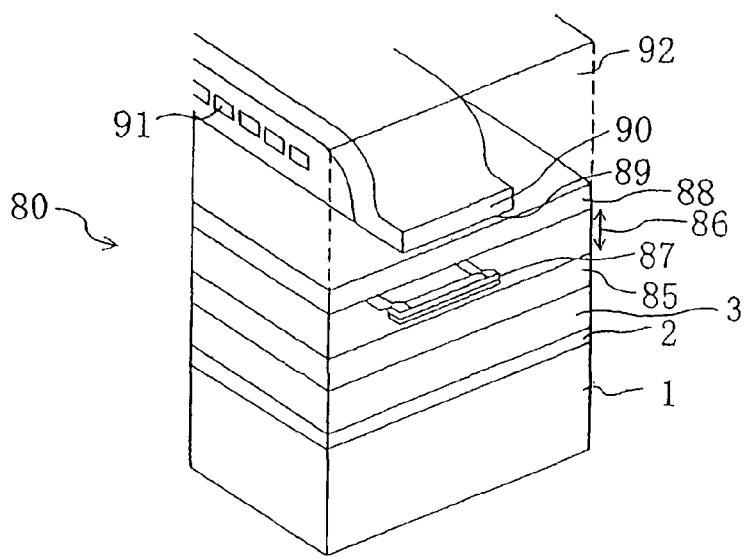
FIG. 6 is a perspective view illustrating main portions of a thin-film magnetic head slider according to the present invention.

FIG. 6 is a perspective view illustrating main portions of a thin-film magnetic head slider 80. Although no gimbal for the thin-film magnetic head slider 80 is shown in FIG. 6, the main portions shown in FIG. 6 are actually attached to a gimbal similar to that shown in FIG. 7.

The thin-film magnetic head slider 80 includes a ceramic base 1, an intermediate layer 2 deposited on the ceramic base 1, an undercoat film 3 deposited on the intermediate layer 2, and a shield film 85 deposited on the undercoat film 3. In this preferred embodiment, a Cr film with a thickness of 10 nm is deposited as the intermediate layer 2 and an aluminum oxide is deposited as the undercoat film 3 to a thickness of 1 μm.

A gap 86 of about 0.4 μm is provided over the shield film 85. A GMR read device 87 is preferably embedded in the gap 86 and may have a known structure including an electrode and a GMR film (not shown). The gap 86 may be an insulating film of alumina, for example, which has been deposited on the shield film 85 so as to cover the GMR read device 87. The GMR read device 87 may have a thickness of about 0.1 μm, for example. It should be noted that the magnetic element (i.e., read device) to be provided on the shield film 85 is not limited to the GMR device but may also be any other type of element such as an MR or TMR element.

Another shield film 88 is deposited on the insulating film that defines as the gap 86. These two shield films 85 and 88 are made of a soft magnetic material such as a permalloy, and may also function as magnetic shield films. A top pole 90 (with a thickness of 2 μm to 3 μm) is provided over the shield film 88 with a write gap 89 of 0.4 μm to 0.6 μm provided between them. A coil pattern 91, formed by patterning a Cu film with a thickness of about 5 μm, is provided between the shield film 88 and the top pole 90. The coil pattern 91 is coated with an organic insulating film. The coil pattern 91 and top pole 90 together define a write head portion. When a current is supplied through the coil pattern 91, a magnetic field is generated near the write gap 89, thereby writing (i.e., recording) data onto a magnetic storage medium (not shown). The write head portion is covered with an overcoat film 92 with a thickness of 40 μm, for example.

The thin-film magnetic head slider 80 may be fabricated in the following manner, for example. Specifically, first, a thin-film magnetic head wafer is prepared by depositing an intermediate layer 2 and an undercoat film 3 in this order on a ceramic base 1. Next, the multilayer structure, including the shield film 85 at the bottom and the overcoat film 92 at the top, is formed on the wafer by normal thin film deposition and photolithographic processes. Thereafter, the wafer is preferably divided into multiple chips so as to obtain the head portions as shown in FIG. 7. Subsequently, each of those head portions is subjected to an air bearing surface (ABS) process and then attached to a gimbal, thereby completing a thin-film magnetic head slider.

According to the preferred embodiment described above, the intermediate layer 2 is provided. Accordingly, even if the thermal conductivity is increased by reducing the thickness of the undercoat film 3 to 1 μm, excellent electrical insulation property can still be maintained. Thus, thanks to the resultant good heat dissipation ability, the TPTR phenomenon, which would often be caused due to the heat generated from a write device, can be minimized and the electrostatic or dielectric breakdown of the thin-film magnetic head slider can be prevented as well. As a result, the thin-film magnetic head slider can have an even smaller size.

EXAMPLE 3

In the thin-film magnetic head slider 80 of the second example described above, the intermediate layer 2 covers the entire surface of the ceramic base 1. However, the present invention is in no way limited to such a specific example.

A manufacturer of thin-film magnetic heads, who purchased thin-film magnetic head substrates on which the undercoat film 3 has been deposited, carries out the process steps of depositing various thin films on the undercoat film 3 and patterning them, thereby completing thin-film magnetic head sliders. To perform this patterning process step, a resist mask pattern needs to be defined on an appropriate position on the ceramic base 1 during a photolithographic process. For that purpose, mask alignment needs to be done and alignment marks should be left on the ceramic base 1.

The alignment marks should be left either on the surface of the undercoat film 3 or on one of the layers stacked on the undercoat film 3 at any stage of the manufacturing process of thin-film magnetic head sliders. However, if the intermediate layer 2, made of a metal or any other material with high optical reflectance, covers the entire surface of the ceramic base 1, then it will be difficult to sense the alignment marks optically during the photolithographic process.

Meanwhile, the present inventors discovered and confirmed via experiments that the intermediate layer 2 did not have to cover the entire principal surface of the ceramic base 1 but could achieve the effects described above sufficiently even when having openings where no electrical/magnetic transducers were arranged.

To get the dielectric breakdown strength of the undercoat film 3 increased by the intermediate layer 2, it is sufficient to cover portions of the undercoat film 3 which might have significantly decreased dielectric breakdown strength (i.e., where the electrical/magnetic transducers should be provided) with the intermediate layer 2. More specifically, the pattern of the intermediate layer 2 needs to be defined where the electrical/magnetic transducers should be provided. If each of those electrical/magnetic transducers includes a lower magnetic shield film, an upper magnetic shield film, and a magneto-resistive element (such as a GMR element) sandwiched between these magnetic shield films, then the intermediate layer 2 is preferably patterned so as to cover the entire projection of the magneto-resistive element on the principal surface of the ceramic base 1.

The patterned intermediate layer 2 may be obtained by various methods. For example, a film of the material of the intermediate layer 2 may be deposited on the ceramic base 1 and then a resist mask (not shown) may be defined on this film by a photolithographic process. The resist mask has been subjected to exposure and developed processes so as to define the final pattern of the intermediate layer 2. If portions of the film that are not covered with the resist mask are etched away, the intermediate layer 2 can be patterned into any desired shape.

However, the intermediate layer 2 does not have to be patterned by such a photolithographic process but may also be patterned by a so-called "liftoff process". Specifically, in the liftoff process, a resist mask (not shown) is defined on the ceramic base 1 first. Then, a film of the material of the intermediate layer 2 is deposited on the resist mask. In this process step, portions of the principal surface of the ceramic base 1, which are not covered with the resist mask, get coated with the material of the intermediate layer 2. Thereafter, when the resist mask is removed, portions of the material of the intermediate layer 2, which have been deposited on the resist mask, are removed. As a result, a patterned intermediate layer 2 can also be obtained.

FIG. 8(*a*) shows a layout (or the arrangement) of an electrical/magnetic transducer and a patterned intermediate layer 2 according to this example, and FIG. 8(*b*) is a cross-sectional view thereof as viewed on the B-B' plane. In FIGS. 8(*a*) and 8(*b*), no coils or terminal electrodes are illustrated for the sake of simplicity.

As shown in FIG. 8(*b*), the intermediate layer 2 has been patterned so as to cover the entire projection of the magnetic shield film 85 on the principal surface of the ceramic base 1. And as can be seen from FIG. 8(*a*), portions of the intermediate layer 2 have been removed from where no magnetic shield film 85 is present. Since the intermediate layer 2 does not cover the entire principal surface of the ceramic base 1 in this manner, the alignment marks can be sensed accurately in the process step of depositing a thin film on the undercoat film 3 and patterning it by a known method.

The shape, size and location of the patterned intermediate layer 2 are not limited to those shown in FIG. 8. The point is that the intermediate layer 2 needs to have been patterned so as to present where the electrical/magnetic transducer is arranged and not to hide the alignment marks to be left on the undercoat film 3. If it is unknown where the alignment marks will be left, then the intermediate layer 2 needs to have a relatively big opening (i.e., an area where no intermediate layer 2 is present). Even so, there is no need to pattern the intermediate layer 2 to a smaller size than the magnetic shield film 85. This is because no alignment marks should be left where the lower magnetic shield film is located.

Each of the alignment marks is defined as an uneven pattern that has been made on either the surface of the undercoat film 3 or that of another film deposited on the undercoat film 3. Such an alignment mark may be left at any arbitrary position by a manufacturer of magnetic head sliders who purchased the thin-film magnetic head substrates on which the undercoat film 3 has been deposited.

Optionally, in addition to such an alignment mark (which will be referred to herein as a "second alignment mark"), the manufacturer of thin-film magnetic head substrates may leave another alignment mark (which will be referred to herein as a "first alignment mark") in advance under the undercoat film 3. The latter alignment mark (i.e., the first alignment mark) can be used effectively to position the lower magnetic shield film 85 or any other pattern to make the electrical/magnetic transducer with respect to the patterned intermediate layer 2. More specifically, the manufacturer of magnetic head sliders, who purchased the thin-film magnetic head substrate of the present invention, can leave the second alignment mark on either the surface of the undercoat film 3 or on another film deposited on the undercoat film 3 by reference to the first alignment mark on the ceramic base 1. The positional relationship between the first and second alignment marks is defined in this manner. As a result, when the electrical/magnetic transducer is positioned with respect to the second alignment mark after that, the pattern of the intermediate layer 2 under the undercoat film 3 and the electrical/magnetic transducer can be arranged just as originally designed.

The first alignment mark is preferably made of the film to be the intermediate layer 2 while the intermediate layer 2 is being patterned. In a preferred embodiment of the present invention, a lot of thin-film magnetic head sliders are fabricated on the ceramic base 1 as a single wafer. That is why the patterned intermediate layer 2 needs to be arranged under each of those electrical/magnetic transducers that are going to be fabricated on the ceramic base 1. Nevertheless, it should be enough to leave at least two alignment marks of the first type per ceramic base 1 as a wafer.

Figure 9:
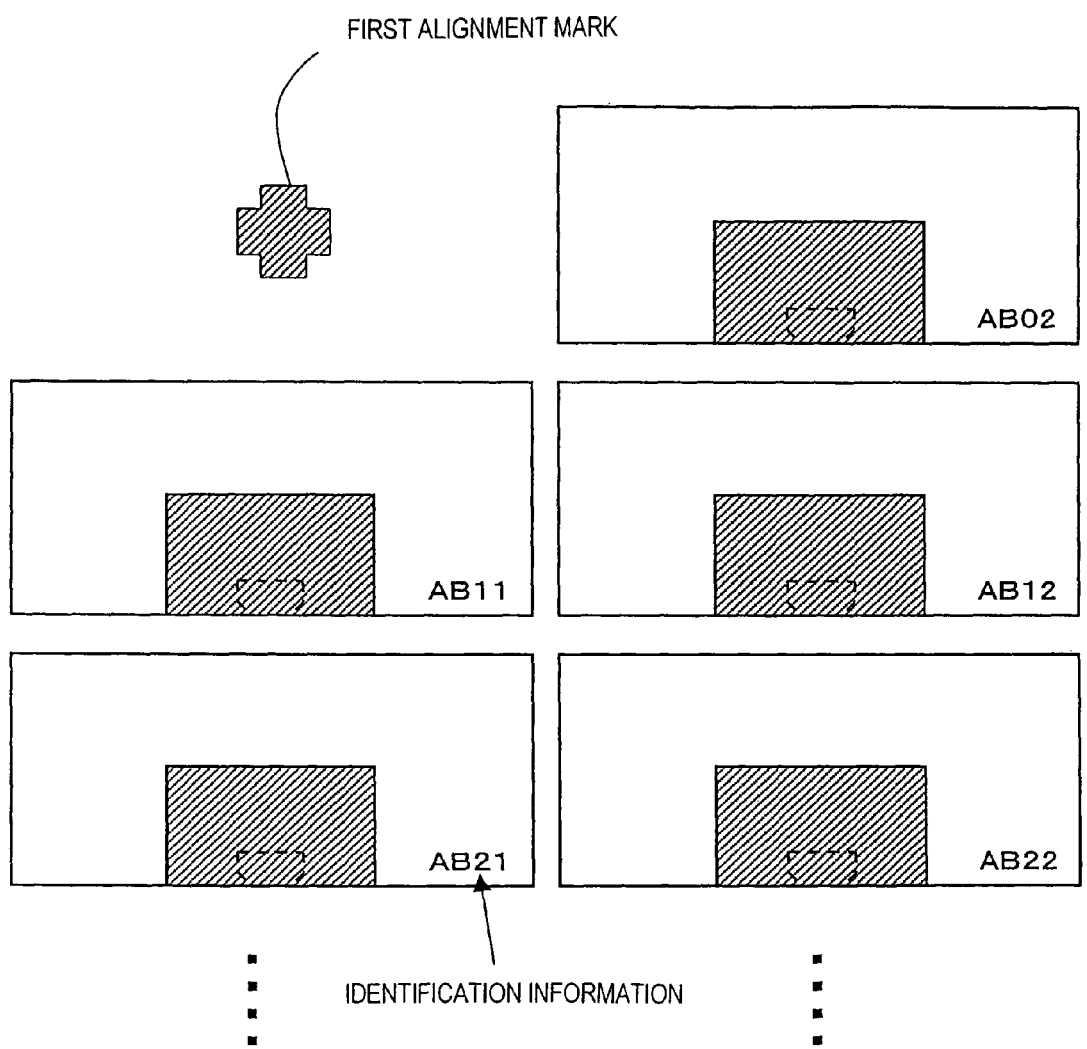
FIG. 9 is a schematic representation illustrating, on a larger scale, portions of the principal surface of a wafer according to a second example of the present invention.

FIG. 9 is a schematic representation illustrating portions of the principal surface of a ceramic wafer according to the present invention on a larger scale. In FIG. 9, five of the thin-film magnetic head slider chips, which will be separated from the wafer finally, are illustrated. The first alignment mark described above is left in an area on the principal surface of the ceramic wafer other than rectangular areas for respective chips. If the first alignment mark is made by patterning the film to be the intermediate layer 2, then the first alignment mark can be arranged accurately with respect to the patterns defined in the respective chip areas.

In addition to making the first alignment mark of the film to be the intermediate layer 2 or without leaving the first alignment marks at all, a pattern representing "identification information" may be left. Such identification information preferably includes information about the identity of the ceramic wafer 1 and may include information to identify the respective magnetic head sliders to be separated eventually. In FIG. 9, code sets such as "AB02", "AB11", "AB12", "AB21" and "AB22" are recorded at a corner of the rectangular areas for respective chips.

If these pieces of identification information are provided between the undercoat film 3 and the ceramic wafer 1, then it is possible to know where a lot of defective magnetic head sliders came from (i.e., who manufactured the thin-film magnetic head substrates of the defective products and where the defects are located). As a result, the traceability increases. These pieces of identification information are preferably provided where no terminal electrodes or other components are located so that the identification information can be easily detected externally.

In the prior art, the identification information is provided on one of the two principal surfaces of the ceramic wafer 1 where no electrical/magnetic transducers are arranged. Meanwhile, in this example, the patterns representing the identification information are made while the intermediate layer 2 is being patterned, and therefore, the identification information is provided on the principal surface on which the electrical/magnetic transducers are located. That is why the identification information needs to be provided so as not be hidden behind the electrical/magnetic transducers or terminal electrodes.

EXAMPLE 4

The same base as that used in the first example was prepared and an intermediate layer of Cr was deposited on the AlTiC base and then an undercoat film was deposited thereon by the same method as that adopted in the first example. The resultant substrate will be referred to herein as an "example". On the other hand, an undercoat film was deposited on an AlTiC base by the same method as that described above except that no intermediate layer was inserted between them. The resultant substrate will be referred to herein as a "comparative example".

Figure 10:
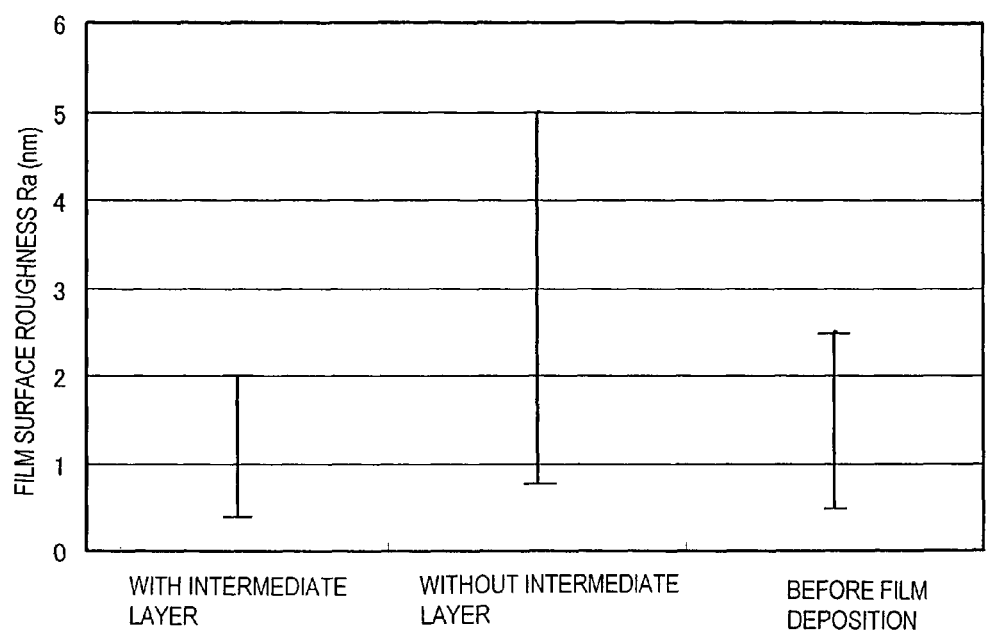
FIG. 10 is a graph showing the results of surface roughness measured.

The surface roughness Ra was measured with an atomic force microscope (AFM) on the surface of the AlTiC base before the film was deposited thereon, on the surfaces of the intermediate layer and undercoat film of the example, and on the surface of the undercoat film of the comparative example. FIG. 10 is a graph showing the results of measurement. In FIG. 10, "with intermediate layer", "with no intermediate layer" and "before deposition" refer to the example, the comparative example and the AlTiC base before the film was deposited thereon, respectively.

As can be seen from FIG. 10, the surface of the undercoat film can be planarized by providing the undercoat film.

A thin-film magnetic head substrate according to preferred embodiments of the present invention described above exhibits excellent thermal conductivity and electrical insulation property, and therefore, can be used effectively to make a highly reliable thin-film magnetic head slider or hard disk drive with huge storage capacity.

The invention claimed is:

1. A thin-film magnetic head substrate comprising:
a ceramic base with a principal surface; and
an undercoat film, which is made of an aluminum oxide and which covers the principal surface of the ceramic base, an electrical/magnetic transducer being provided on the undercoat film; wherein the substrate further includes an intermediate layer between the principal surface of the ceramic base and the undercoat film;
the intermediate layer is made of a material other than the aluminum oxide, has been patterned so as to make a portion of the principal surface of the ceramic base contact with the undercoat film, and has an opening where the electrical/magnetic transducer is not located;
the ceramic base is a single monolithic layer arranged to be the bottom-most layer of the thin-film magnetic head substrate;
in a region other than the opening of the intermediate layer, as viewed in a direction perpendicular to the principal surface of the ceramic base:
the intermediate layer is present between the undercoat film and the ceramic base; and
the undercoat film is not in contact with the ceramic base; and
the intermediate layer is made of a non-magnetic material.

2. The thin-film magnetic head substrate of claim 1, wherein the electrical/magnetic transducer provided on the undercoat film includes: a lower magnetic shield film; a magneto-resistive element arranged on the lower magnetic shield film; and an upper shield film, which has been deposited on the lower magnetic shield film so as to cover the magneto-resistive element, and
wherein the intermediate layer has been patterned so as to cover the entire projection of the magneto-resistive element on the principal surface of the ceramic base.

3. The thin-film magnetic head substrate of claim 2, wherein the intermediate layer has been patterned so as to cover the entire projection of the lower magnetic shield film on the principal surface of the ceramic base.

4. The thin-film magnetic head substrate of claim 1, wherein the intermediate layer has a thickness of 1 nm to 1 µm.

5. The thin-film magnetic head substrate of claim 1, wherein the intermediate layer is made of a metal film or a Si film.

6. The thin-film magnetic head substrate of claim 1, wherein the undercoat film has a thickness of 10 nm to 1 µm.

7. The thin-film magnetic head substrate of claim 1, wherein the ceramic base is made of an alumina-based ceramic material including 24 mol % to 75 mol % of $\alpha$-$Al_2O_3$ and at most 2 mol % of an additive.

8. The thin-film magnetic head substrate of claim 7, wherein the ceramic base further includes a carbide or nitride carbonate of a metal.

9. A thin-film magnetic head slider comprising:
the thin-film magnetic head substrate of claim 1.

10. A hard disk drive comprising the thin-film magnetic head slider of claim 9.

11. A method of making a thin-film magnetic head slider, the method comprising the steps of:
preparing the thin-film magnetic head substrate of claim 1; and
fabricating the electrical/magnetic transducer on the undercoat film.

12. The thin-film magnetic head substrate of claim 1, wherein the intermediate layer is a flat single layer that is formed on the principal surface of the ceramic base.

13. The thin-film magnetic head substrate of claim 1, wherein the intermediate layer is in contact with both of the undercoat film and the ceramic base in the region other than the opening of the intermediate layer, as viewed in a direction perpendicular to the principal surface of the ceramic base.

14. The thin-film magnetic head substrate of claim 1, wherein the intermediate layer is made of a material selected from the group consisting of Cu, alloys including Cu and Cr, and alloys including Cr and Si.

15. A thin-film magnetic head substrate comprising:
a ceramic base with a principal surface; and
an undercoat film, which is made of an aluminum oxide and which covers the principal surface of the ceramic base, an electrical/magnetic transducer being provided on the undercoat film; wherein
the substrate further includes an intermediate layer between the principal surface of the ceramic base and the undercoat film;
the intermediate layer is made of a non-magnetic material other than the aluminum oxide, has been patterned so as to make a portion of the principal surface of the ceramic base contact with the undercoat film, and has an opening where the electrical/magnetic transducer is not located;
the ceramic base is a single monolithic layer arranged to be the bottom-most layer of the thin-film magnetic head substrate;
in a region other than the opening of the intermediate layer, as viewed in a direction perpendicular to the principal surface of the ceramic base:
the intermediate layer is present between the undercoat film and the ceramic base; and
the undercoat film is not in contact with the ceramic base; and
a portion of the intermediate layer makes an alignment mark arranged to be used in positional alignment.

16. A thin-film magnetic head substrate comprising:
a ceramic base with a principal surface; and
an undercoat film, which is made of an aluminum oxide and which covers the principal surface of the ceramic base, an electrical/magnetic transducer being provided on the undercoat film; wherein
the substrate further includes an intermediate layer between the principal surface of the ceramic base and the undercoat film;
the intermediate layer is made of a non-magnetic material other than the aluminum oxide, has been patterned so as to make a portion of the principal surface of the ceramic base contact with the undercoat film, and has an opening where the electrical/magnetic transducer is not located;
the ceramic base is a single monolithic layer arranged to be the bottom-most layer of the thin-film magnetic head substrate;
in a region other than the opening of the intermediate layer, as viewed in a direction perpendicular to the principal surface of the ceramic base:
the intermediate layer is present between the undercoat film and the ceramic base; and
the undercoat film is not in contact with the ceramic base; and
a portion of the intermediate layer makes a pattern representing identification information.

17. The thin-film magnetic head substrate of claim 16, wherein the identification information includes information about the identity of the ceramic base.

18. The thin-film magnetic head substrate of claim 16, wherein the pattern representing the identification information has been recorded on a plurality of areas of the principal surface of the ceramic base, mutually different pieces of the information being distributed to the respective areas.

19. The thin-film magnetic head substrate of claim 18, wherein the areas are arranged so as to form multiple different thin-film magnetic heads when the substrate is divided.

* * * * *